March 10, 1970  J. A. FINGERETT ETAL  3,499,332
CONTROL SYSTEM FOR AN INERTIAL PLATFORM
Filed Sept. 25, 1968

INVENTORS
JOSEPH A. FINGERETT
LAURENCE McGANN
RICHARD C. TURNBLADE

BY H. H. Losch
ATTORNEY

United States Patent Office 3,499,332
Patented Mar. 10, 1970

3,499,332
CONTROL SYSTEM FOR AN INERTIAL PLATFORM
Joseph A. Fingerett, Van Nuys, Laurence McGann, Woodland Hills, and Richard C. Turnblade, Northridge, Calif., assignors to the United States of America as represented by the Secretary of the Navy
Filed Sept. 25, 1968, Ser. No. 762,432
Int. Cl. G01c 19/28
U.S. Cl. 74—5.6
8 Claims

ABSTRACT OF THE DISCLOSURE

A control system for an inertial platform having a gas bearing rotatably supported gyroscope ball rotor in a spinning rotor with a mirror surface concentric and normal to the spin axis of the ball rotor to reflect a point light source to fall equally on light sensitive elements arranged to detect light inequalities in the x and y directions to control through servo amplifiers and servo motors coupled to the x and y axes gimbals the detected errors to correct the misalignment of the spinning rotor axis to maintain equal amount of light on the light sensitive elements.

BACKGROUND OF THE INVENTION

This invention relates to inertial platform stabilization systems and more particularly to a control system for maintaining the axis of a ball rotor within a spinning gyroscope rotor centrally of a light sensitive component error detecting means.

Gyroscopes have been used for years to maintain a fixed oriented position in space. However, due to various forces acting on the gyroscope rotor, such as bearing friction in the rotor and gimbals, positional drift as a result of imperfections, rotor unbalance, gimbal unbalance, etc., the gyroscope is caused to deviate from its true fixed position by these low torques. Many of these forces have been materially reduced or minimized in the use of gas, liquid, or air bearings in the gimbals and in the use of a crystal-ball air or liquid bearing supported type, still some of these low torque forces exist. To provide an inertial system with a gyroscope of zero drift would be a great advantage in intercontinental navigation.

SUMMARY OF THE INVENTION

In the present invention a gyroscope of the type having the rotor of spherical shape, as a "crystal ball" and supported on an air, liquid, or gas bearing within a spinning rotor with air bearing gimbaled supports, is used. As in the usual gyroscope gimbaled systems, a torque motor, or torquer, is fixed between the supporting body or case and the outer gimbal and between the outer and inner gimbals to impart corrective forces in the two degrees or axes of orientation. In like manner, gimbal axis pickoffs are positioned for pickoff of relative rotation between the parts for monitoring angular motions in the x and y axes. The crystal ball rotor is flattened at one pole position and the flattened portion mirrored to reflect a point light source positioned on the inner gimbal on an optimum axis of ball and rotor rotation. Four light sensitive elements supported on the inner gimbal surround the light source or beam to receive reflected light from the mirrored surface, these light sensitive elements being arranged in pairs to respond to rotor axis deviations in the x-axis and y-axis directions. Each pair of light sensitive elements is coupled to a control circuit to evaluate any error signals in the x and/or y directions and to cause a control signal to be delivered to the proper torquer or torquers to realign the spinning rotor axis to bring spinning rotor axis into alignment with the optimum axis in which the light beam is centered with respect to the light sensitive elements. The control circuit includes a compensation circuit for each x and y axis to minimize gyro drift caused by servo-dynamics. The control circuit also includes a decoupler circuit for each x and y channel coupled to the opposite channel to reduce the rotation of the gimbal in that channel the exact amount of rotation caused by the torque from the other channel. It is therefore a principal object of this invention to control an inertial gyroscopic platform to maintain zero drift.

BRIEF DESCRIPTION OF THE DRAWING

These and other objects and the attendant advantages, features, and uses will become more apparent to those of ordinary skill in the art as a more detailed description is given when considered along with the accompanying drawing, in which.

DESCRIPTION OF THE PREFERRED EMBODIMENT

Figure 1:
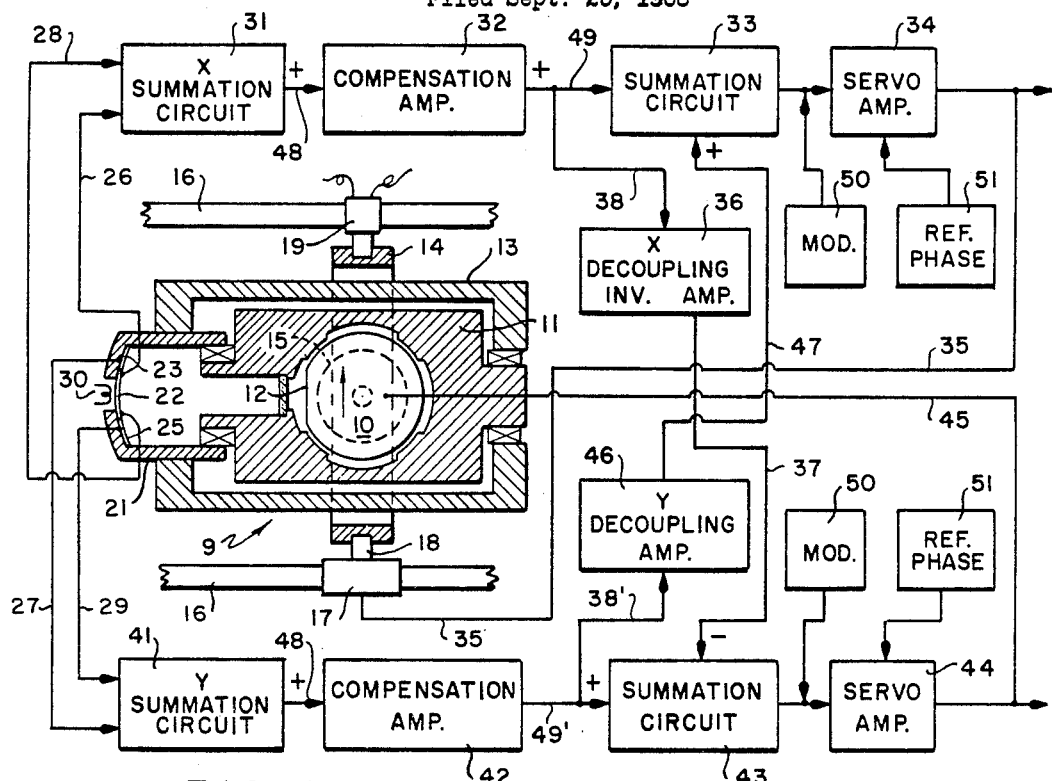
FIGURE 1 is a partially block circuit schematic and partially sectional view of the combination conceived in this invention.

Referring more particularly to FIGURE 1 there is shown in cross-sectional view a crystal ball gas bearing supported gyroscope 9 in which a crystal ball rotor 10 is supported in a spinning rotor 11 by a gas, liquid, or air bearing, as is well understood by those skilled in the art, and of the type shown in the patent to Betts 3,226,982, which issued on Jan. 4, 1966, on Gyroscope With Liquid Immersed Rotor. The crystal ball rotor 10 has a small flattened mirrored surface 12 at one pole position or normal to the axis of rotation of the crystal ball rotor 10 and the axis of rotation of the spinning rotor 11. Perpendicular to the axis of rotation of the crystal ball rotor 10 and the spinning rotor 11 is the y-axis support of the inner gimbal 13, this y-axis support being from an outer gimbal 14 by air bearings of the type known in the art but not herein shown. Let it be understood that this y-axis is horizontally through the inner gimbal 13 with a torque motor, or torquer 15, on one y-axis termination, as shown in dotted lines in FIGURE 1. The outer gimbal 14 is fixed in the gyro case herein shown to be a framework 16 fixedly supported as in an aircraft airframe or ship borne structure with the x-axis passing vertically through the intersection of the y-axis and ball rotor 10 spin axis. The outer gimbal is supported on air bearings in any well known manner in the case 16 and has a torque motor or torquer 17 operative on one x-axis extremity through the shaft means 18, as shown in FIGURE 1. On the opposite x-axis extremity is a pickoff selsyn device 19 for picking off the x-axis position. In like manner a y-axis pickoff would be used on the opposite extremity of the y-axis of the gyro which, in the view shown in FIGURE 1, is cut away by the sectional view. As may be well understood from the above description and of the known art of gyroscopes, the gyroscope 9 has two degrees of freedom about the x (vertical) and y (horizontal) axes as illustrated in FIGURE 1 to provide control in the x (horizontal) and y (vertical) planes. The spin axes of the ball rotor 10 and spinning rotor 11 are also in the horizontal plane as shown in FIGURE 1, it being well understood that these three axes, the spin axes of the ball rotor and spinning rotor, the x-axis, and the y-axis intersection, if projected, would be in the center of the crystal ball rotor 10.

Figures 2, 3:
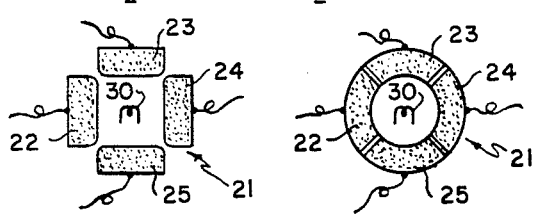
FIGURE 2 is a detailed elevation of the light sensitive elements shown in FIGURE 1.
FIGURE 3 is a detailed elevation of a modification of the light sensitive elements shown in FIGURE 2.

Mounted in any suitable manner, but herein shown in FIGURE 1 as being mounted on the inner gimbal 13, is a light sensitive component 21 consisting of four light sensitive elements 22, 23, 24, and 25 forming a square or circular pattern in which the elements 22 and 24 are in the horizontal plane and the elements 23 and 25 are in the vertical plane and electrically insulated from the case. FIGURES 2 and 3 are referred to for two embodiments of the light sensitive elements. Each element has an output conductor, the output conductor of the element 22 being identified by the reference character 26, the output conductor for the element 23 being 27, the output conductor for the element 24 being 28, and the output conductor for the element 25 being 29. On the optimum spin axis of the ball rotor 10 at a fixed distance outwardly from the mirrored surface 12 is a point light source, such as an incandescent bulb 30, which may be energized in any suitable manner. Whe the spin axis of the gyro ball rotor 10 is precisely through the point source of light 30, the reflected light will fall equally on all four of the light sensitive elements 22 through 25. If the spin axis of the spinning rotor 11 deviates in the x-axis direction, the reflected light will fall unequally on the elements 22 and 24 since the spin axis of the ball rotor 10 will remain stationary. Similarly, if the spin axis of the spinning rotor 11 deviates vertically in the y-axis direction, reflected light will fall unequally on the light sensitive elements 23 and 25.

Two similar circuit channels are coupled to the light sensitive elements. The light sensitive elements 22 and 24 are coupled through the conductors 26 and 28 to an x-axis summation circuit 31 while the y-axis light sensitive elements 23 and 25 are coupled through the output conductors 27 and 29 to a y-axis summation circuit 41. The x and y summation circuits 31 and 41 may be a differential amplifier circuit or an integrator circuit for producing a difference signal from the outputs of the two light sensitive elements. For example, if the spin axis of the spinning rotor 11 is deflected to the left, or counterclockwise, as viewed from the bottom of the gyroscope, a greater light flux will fall on the light sensitive element 24 than on the light sensitive element 22 since the spin axis of the ball rotor 10 remains stationary. This difference will be determined in the x-axis summation circuit 31 to produce a positive voltage on the output of the summation circuit. In like manner, if the spin axis of the spinning rotor 11 is deflected downwardly, or counterclockwise, as viewed looking onto the FIGURE 1, so that the light sensitive element 23 receives more light flux than the light sensitive element 25, the y-axis summation circuit 41 will produce a positive voltage output. The output of the x-axis summation circuit 31 is coupled through a compensation amplifier circuit 32 to a summation circuit 33 and the output of the summation circuit 33 is coupled to a servo amplifier 34. In like manner, the y-axis summation circuit 41 is coupled through a compensation amplifier 42 to a summation circuit 43 the output of which is coupled to a servo amplifier 44. The output of the summation circuits 33 and 43 are each modulated by a frequency from the modulator 50 to condition the circuit for servo motor-receiver operation, this modulation frequency being the same for both servo amplifiers and, accordingly shown herein as having the same reference character. In like manner, each servo amplifier has a reference frequency voltage 51 applied thereto, as well understood by those familiar with the servo system art, to produce relative torque angles in the torquer motors 15 and 17. The output of the servo amplifier 34 is coupled to the torquer 17 by way of the conductor means 35 while the servo amplifier output of 44 is coupled by the conductor means 45 to the torquer 15. Accordingly, the x-axis channel consists of the elements 31 through 35 while the y-axis channel consists of the elements 41 through 45. The summation circuits 33 and 43, like the summation circuits 31 and 41, could each be a differential amplifier circuit or an integrator circuit for carrying out the sum and difference of the signals applied.

The output of the compensation amplifier 32 is also coupled by conductors 49 and 38 to an x-axis decoupling inverter amplifier 36, the output on its conductor means 37 being coupled to the summation circuit 43. In like manner, the output of the compensation amplifier circuit 42 is coupled by conductors 49' and 38' to a y-axis decoupling amplifier 46, the output on the conductor 47 being coupled as the second input to the summation circuit 33. The x and y axis decoupling amplifiers are more particularly shown in FIGURE 4, the only difference being in the two amplifiers that the x decoupling amplifier inverts the signal for the reason soon to be disclosed in the description of operation. Also, the compensation amplifier circuits 32 and 42 are more fully disclosed in FIGURE 5.

Figure 4:
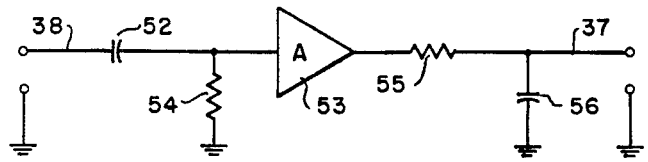
FIGURE 4 is a partially schematic and partially block circuit diagram of the decoupling amplifiers used in FIGURE 1.

Referring more particularly to FIGURE 4, the output of the compensation amplifier 32 (or 42) is an input over the conductor 38 to the decoupling amplifier, this being through a direct current (DC) decoupling capacitor 52 to a DC amplifier 53. The input of the DC amplifier 53 is biased by resistance 54 to a fixed potential, such as ground. The output of the amplifier 53 is through a resistance 55 to the output conductor 37 (or 47) and this output conductor is coupled to one plate of capacitor 56, the opposite plate of which is grounded. The amplifier 53 for the x-axis decoupling circuit 36 will be an inverting amplifier whereas the amplifier 53 for the y-axis decoupler will not be inverting. As long as the ball rotor 10 of the gyroscope 9 reflects light from surface 12 equally on all four of the light sensitive elements 22 through 25, there will be a zero voltage output from the x summation circuit 31 and the y summation circuit 41 and likewise a zero output from the compensation amplifiers 32 and 42. Zero voltages are therefore applied to the decoupling amplifiers and no voltage will be produced on the outputs 37 and 47. When a deviation of the spin axis of the spinning rotor 11 exists in either the x or y direction, a positive or negative polarity voltage will become existent on the outputs of the summation circuits 31 and/or 41 and compensation circuits 32 and/or 42. Any dynamic change in this DC voltage on the input 38 (FIGURE 4) will be applied to the amplifier to produce an amplifier output proportional to the resultant torque on one axis of the gyroscope by virtue of a torque produced on the other axis since a reactive torque is produced 90° in the direction of spin of the spinning rotor 11. Accordingly, it may be seen that the decoupling amplifiers 36 and 46 are decoupled from the circuit except when dynamic voltage changes occur which result from changes or deviation of the spin axis of the spinning rotor 11.

Figure 5:
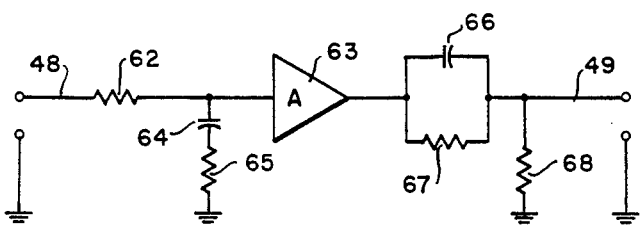
FIGURE 5 is a partially block and partially circuit schematic of the compensation circuits used in FIGURE 1.

Referring more particularly to FIGURE 5, the output of the summation circuit 31, as well as 41, is applied as an input on conductor 48 through a resistor 62 to an amplifier 63. The input of the amplifier 63 is coupled to one plate of a capacitor 64, the opposite plate thereof being coupled through a resistor 65 to a fixed or ground potential. The output of the amplifier is coupled through a parallel circuit consisting of a capacitor 66 and a resistor 67 to the output terminal 49. Output terminal 49 is coupled through a resistor 68 to ground potential. These compensation amplifier circuits 32 and 42 operate as frequeny compensating networks to reduce the damping oscillation effects of the x-axis or y-axis error signals applied thereto thus minimizing servo dynamics. The elements 62, 64, and 65 filter off these oscillator voltage swings of the DC output from the summation circuits 31 and 41 to stabilize the DC output of the amplifier 63 which is readily settled at the proper DC amplitude by the elements 66 and 67 of the parallel circuit for the output 49. Accordingly, the compensation amplifiers quickly produce a substantially clean DC voltage output for any gyroscope error signal voltages prior to the summation circuits 33 and 43 and decoupling amplifiers 36 and 46.

OPERATION

In the operation of the device as shown in FIGURE 1, let it first be assumed that the crystal ball gyroscope rotor 10 is in its spin operation with its spin axis on the optimum axis in which the reflected light from the surface 12 produces an equal light flux on all the elements 22 through 25. Under this condition zero voltage output results from the summation circuits and compensation amplifier circuits and likewise a zero voltage appears on both the outputs 35 and 45 to the torque motors 17 and 15. As long as the spin axis of the gyroscope spinning rotor 11 remains on the optimum axis, no voltage will be applied to the torquers.

Now let it be assumed that the spin axis of the spinning rotor 11 deviates to the left, or counterclockwise, on the x-axis, as viewed from the bottom of the gyroscope, the spin axis of the ball rotor 10 remaining stationary, to produce more light flux on the light sensitive element 24 than on the light sensitive element 22 by reason of friction or other forces. This will produce a positive error voltage signal on the output of the summation circuit 31 and on the output of the compensation circuit 32 to the summation circuit 33 and the x-axis decoupling amplifier 36. Let it further be assumed that this positive error signal voltage continues through the summation circuit 33 and servo amplifier 34 to produce a positive voltage on the output 35 to the torquer 17. Let it be assumed too that a positive voltage on the torquer 17 will produce a clockwise movement or torque of the outer gimbal 14 along the x-axis, as viewed from the underside of the gyroscope, to return the spin axis of the spinning rotor 11 to its position along the optimum axis. If the spinning rotor 11 is spinning as shown by the arrow on the surface of the ball rotor 10, a clockwise rotative force on the outer gimbal 14 (as viewed from the bottom) will tend to torque bias the inner gimbal 13 of the gyroscope to rotate clockwise, as viewed into the paper, to cause the spin axis of the spinning rotor 11 to be deviated upwardly along the y-axis. The x-axis decoupling inverter amplifier 36 becomes operative to produce a negative voltage in the summation circuit 43, the input from the compensation amplifier 42 being zero in this example, to produce a negative summation circuit 43 output to the servo amplifier thereby producing negative voltage signal on the output 45 to the torquer 15. This negative voltage on torquer 15 will produce a counterclockwise torque bias on the inner gimbal 13 to exactly counteract the torque bias produced by virtue of the outer gimbal being torqued or rotated clockwise. Accordingly, the spin axis of the spinning rotor 11 will be brought in coincidence to the optimum axis so that the spin axis of the ball rotor 10 maintains equal light flux on the elements 22–25 without any error introduced by virtue of the resultant torque on the gimbal 13 due to the direction of the rotation of the spinning rotor 11.

In a second example of operation let it be assumed that the spin axis of spinning rotor 11 deviates downwardly thereby producing more light flux on the light sensitive element 23 than on the light sensitive element 25 by reason of friction or other forces acting on the gyroscope since the spin axis of ball rotor 10 remains stationary. This difference in light flux will be processed in the y-axis summation circuit 41 to produce a positive error signal output through the compensation amplifier 42 to the summation circuit 43 and the y-axis decoupling amplifier 46. This positive error voltage will be applied to the servo amplifier 44 and the positive error signal voltage transmitted over the output 45 to the torquer 15. Again assuming that a positive error voltage will produce a clockwise torque, torquer 15 will apply torque to the inner gimbal 13 of the gyroscope 9 to raise the spin axis of spinning rotor 11 sufficient to bring it to the optimum axis at which time the error signal voltage will come to zero since the spin axis of ball rotor 10 has remained stationary. In actual operation, a clockwise torque on the inner gimbal 13 will result in a counterclockwise torque or bias on the outer gimbal 14 as viewed from the bottom. The decoupling amplifier 46 is operative to produce positive voltage on the output 47 to the summation circuit 33, the other input to the circuit 33 being zero, thereby producing positive voltage output to the servo amplifier 34 and a positive voltage on the output 35 to the torquer 17 to torque bias the outer gimbal 13 in a clockwise direction sufficient to offset the error torque bias produced by the spin of the spinning rotor 11. In this manner the spin axis of spinning rotor 11 will be raised to the optimum axis without an x-axis error being introduced by a torque applied to y-axis from torquer 15.

As may be seen in these two examples the error voltages in both examples were positive and these positive voltages are shown over the conductors from the summation circuits to the compensation ciuits to the summation circuits in each channel, although it is to be understood that the polarities of these signals may be reversed for reversed conditions given by the examples. In view of the above description it may be seen that any deviation of the spin axis of the gyro spinning rotor 11 will be detected by the light sensitive component 21 for any errors on the gyroscope caused by friction in the bearings of gimbals, or unbalance of the gimbal or rotor, or for other causes introducting a change or deviation in the spin axis of the spinning rotor 11. The light sensitive component 21 will cause operation through each x and y channel to produce corrective torques to the x and y axes of the gyroscope in a rotative direction to return the spin axis to the optimum axis. The pickoff device 19 for the x-axis and a similar pickoff for the y-axis may be coupled to indicators or the like to indicate the corrective action being taken by the gyroscope. The output of the servo amplifiers 34 and 44 on the conductors 35 and 45 may be utilized for other circuits such as the auto pilot circuit of the craft for which the inertial system is used.

We claim:
1. A control system for an inertial platform having a crystal ball gyroscope rotor rotatably and frictionlessly suspended within a spinning rotor in a two axis gimbal support with the spinning rotor and inner and outer gimbals suspended in air or gas bearings and with a torquer for each gimbal axis comprising:
a flattened mirrored surface on said ball rotor normal to the spin axis thereof;
a point light source on spin axis of said spinning rotor remote from said flat mirrored surface;
two pairs of light sensitive elements on said inner gimbal surrounding the light path of said light source to said mirrored surface, one pair being responsive to reflected light in the x-axis direction and the other pair being responsive to reflected light in the y-axis direction;
an x-channel and a y-channel, each channel having a first summation means to resolve the voltage of the light sensitive pair into a single voltage, a compensation circuit, a second summation circuit, and a servo amplifier in series coupling from each light sensitive pair to the corresponding torquer; and
a decoupling amplifier between the output of each compensation circuit and said second summation circuit in the other channel whereby any inequalities of light flux reflected onto said two pairs of light sensitive elements will produce resulting error signal voltages of a polarity to drive the appropriate torquers to redirect the rotation of said gyroscope to equalize the light flux on each pair of light sensitive elements.

2. A control system for an inertial platform as set forth in claim 1 wherein each said decoupling amplifier is an amplifier coupled to said compensation circuit through a decoupling capacitor producing a voltage of a polarity to minimize undesired gimbal torque on one gimbal caused by rotation of the other gimbal.

3. A control system for an inertial platform as set forth in claim 2 wherein said first and second summation means are differential amplifiers.

4. A control system for an inertial platform as set forth in claim 1 wherein said first summation means is integrator and said second summation means is an adder circuit.

5. A control system for an inertial platform as set forth in claim 1 wherein said first summation means is an integrator amplifier and said second summation means is a differential amplifier.

6. A control system for an inertial platform as set forth in claim 1 wherein said first summation means is a differential amplifier and said second summation means is an adder circuit.

7. A control system for an inertial platform as set forth in claim 1 wherein said decoupling amplifier is an amplifier preceded by a capacitor with a resistance bias on the amplifier input and succeeded by a resistor in series with a capacitor coupled between the resistance output and a fixed potential.

8. A control system for an inertial platform as set forth in claim 1 wherein said compensation circuit in each channel consists of a resistance in the input coupling to an amplifier, the output of the amplifier being through a parallel network of a capacitance and a resistance, the input of the amplifier having a capacitor and resistance in series to a fixed potential and the output of said parallel circuit being coupled to said fixed potential through a resistance.

References Cited

UNITED STATES PATENTS

| | | | |
|---|---|---|---|
| 3,226,982 | 1/1966 | Betts | 74—5.6 |
| 3,254,537 | 6/1966 | Elwell et al. | 74—5.6 |
| 3,277,304 | 10/1966 | Vyce | 74—5.6 XR |
| 3,422,686 | 1/1969 | Unruh | 74—5.6 |
| 3,439,547 | 4/1969 | Slater | 74—5.6 |
| 3,449,961 | 6/1969 | Samsel | 250—203 XR |

FRED C. MATTERN, Jr., Primary Examiner

M. A. ANTONAKAS, Assistant Examiner

U.S. Cl. X.R.

250—203